United States Patent
Terechko et al.

(10) Patent No.: US 11,142,212 B2
(45) Date of Patent: Oct. 12, 2021

(54) SAFETY-AWARE COMPARATOR FOR REDUNDANT SUBSYSTEMS IN AUTONOMOUS VEHICLES

(71) Applicant: NXP B.V., Eindhoven (NL)

(72) Inventors: Andrei Sergeevich Terechko, Eindhoven (NL); Ali Osman Örs, Ottawa (CA)

(73) Assignee: NXP B.V., Eindhoven (NL)

( * ) Notice: Subject to any disclaimer, the term of this patent is extended or adjusted under 35 U.S.C. 154(b) by 245 days.

(21) Appl. No.: 16/433,165

(22) Filed: Jun. 6, 2019

(65) Prior Publication Data

US 2020/0385008 A1    Dec. 10, 2020

(51) Int. Cl.
*B60W 50/023*   (2012.01)
*G05D 1/00*     (2006.01)
*B60W 50/00*    (2006.01)

(52) U.S. Cl.
CPC ......... *B60W 50/023* (2013.01); *G05D 1/0077* (2013.01); *G05D 1/0088* (2013.01); *B60W 2050/0028* (2013.01); *B60W 2400/00* (2013.01); *G05D 2201/0213* (2013.01)

(58) Field of Classification Search
CPC ........... B60W 50/023; B60W 2400/00; B60W 2050/0028; B60W 60/00272; B60W 60/00276; B60W 2554/805; B60W 2554/4042; B60W 2554/4044; B60W 2554/4026; B60W 2552/45; B60W 2552/53; B60W 2556/45; B60W 30/0956; B60W 30/0953; G05D 1/0088; G05D 1/0077; G05D 2201/0213
See application file for complete search history.

(56) References Cited

U.S. PATENT DOCUMENTS

| | | | |
|---|---|---|---|
| 6,151,539 | A  | 11/2000 | Bergholz et al. |
| 8,817,597 | B2 | 8/2014  | Hall et al. |
| 9,650,038 | B2 | 5/2017  | Yoshimura et al. |
| 2019/0056735 | A1 | 2/2019 | Koopman et al. |

(Continued)

OTHER PUBLICATIONS

Reza Hoseinnezhad et al., Fusion of Redundant Information in Brake-By-Wire Systems Using a Fuzzy Voter, Journal of Advances in Information Fusion, vol. 1, No. 1, Jul. 2006 , pp. 52-62.

(Continued)

*Primary Examiner* — Marthe Y Marc-Coleman

(57) ABSTRACT

A method, system and device are disclosed for determining safety conflicts in redundant subsystems of autonomous vehicles. Each redundant subsystem calculates a world model or path plan, including locations, dimensions, and orientations of moving and stationary objects, as well as projected travel paths for moving objects in the future. The travel paths and projected future world models are subsequently compared using a geometric overlay operation. If at future time moments the projected world models match within predefined margins, the comparison results in a match. In case of a mismatch at a given future moment between projected world models, a determination is made as to whether the autonomous vehicle and all road users in this future moment are safe from collision or driving off the drivable space or road based on a geometric overlay operation.

23 Claims, 10 Drawing Sheets

(56) References Cited

U.S. PATENT DOCUMENTS

2020/0379457 A1* 12/2020 Ostafew .............. G05D 1/0027

OTHER PUBLICATIONS

Shai Shalev-Shwartz et al., On a Formal Model of Safe and Scalable Self-driving Cars, Mobileye, 2017, arXiv:1708.06374v6 [cs.RO], Oct. 27, 2018, pp. 1-37.
Kalhee Kim et al., Fault-Tolerant Software Voters Based on Fuzzy Equivalence Relations, IEEE, 1998, pp. 5-19.
Sebastian Blank et al., A Fuzzy Approach to Low Level Sensor Fusion with Limited System Knowledge, IEEE 13th Conference on Information Fusion, Aug. 2010, 7 pages.
Seong-Ho Kwon et al., Sensor Failure Detection, Identification and Accommodation Using Neural Network and Fuzzy Voter, 2017 17th International Conference on Conlrol, Automation and Systems (ICCAS 2017) Oct. 18-21, 2017, Ramada Plaza, Jeju, Korea, pp. 139-144.
Peter Munk et al., Toward a Fault-Tolerance Framework for COTS Many-Core Systems, 2015 11th European Dependable Computing Conference, pp. 167-177.
Wikipedia, Majority Function, downloaded Jun. 6, 2019, 3 pages.
Wikipedia, Triple Modular Redundancy, downloaded Jun. 6, 2019, 4 pages.

* cited by examiner

SAFETY-AWARE COMPARATOR FOR REDUNDANT SUBSYSTEMS IN AUTONOMOUS VEHICLES

BACKGROUND OF THE INVENTION

Field of the Invention

The present application relates generally to an improved data processing system and method, and more specifically for improved safety in highly automated driving (HAD) vehicles.

SUMMARY OF THE INVENTION

A method, system and computer-usable medium are disclosed for safety-aware comparison in subsystems in autonomous driving vehicles. In certain implementations, data structures of modeled objects in a world environment are received from multiple redundant subsystems, wherein each subsystem provides projected travel paths for the autonomous driving vehicle and other modeled moving objects. The data structures of projected travel paths, object locations and shapes are compared. Determination is performed as to whether the projected travel paths of the multiple redundant subsystems match or do not match, and if data structures of projected paths intersect modeled object and a safety conflict exists.

BRIEF DESCRIPTION OF THE DRAWINGS

The present invention may be better understood, and its numerous objects, features, and advantages made apparent to those skilled in the art by referencing the accompanying drawings, wherein.

DESCRIPTION OF THE RELATED ART

Figure 1:
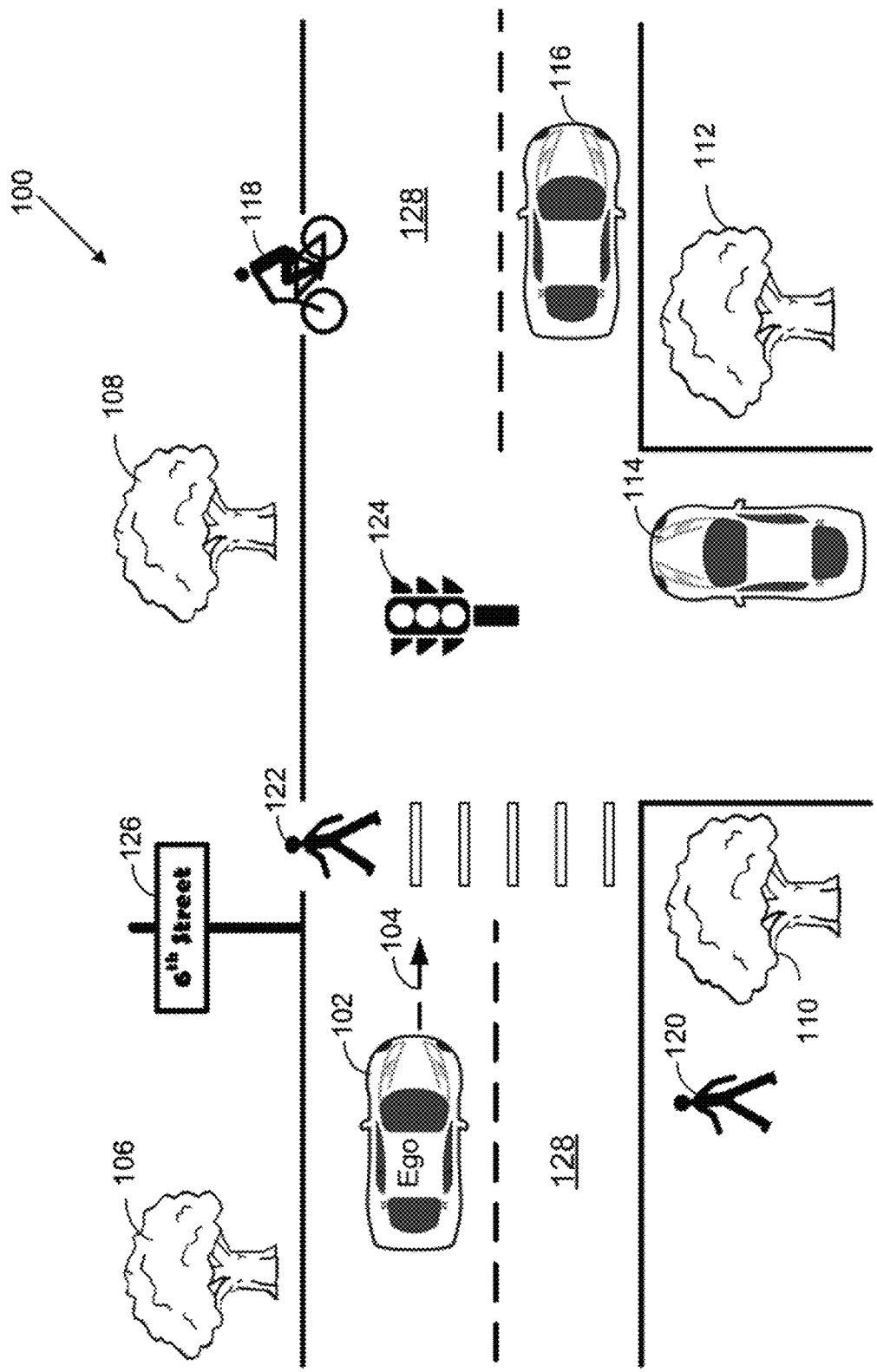
FIG. 1 depicts a world environment for a vehicle implemented with a safety-aware configuration.

Self-driving, autonomous driving, or Highly Automated Driving (HAD) vehicles rely on system redundancy to assure safety. Also, in robotics and automated systems, such as remote drones, system redundancy is used to assure safety. Typical implementations can include multiple redundant and non-redundant sensors that provide external environment inputs to various subsystems. Sensors can include optical cameras, radar, lidar, etc. The subsystems provide projected travel paths for the vehicle based on the external environmental inputs. There can be multiple subsystems in the vehicle providing different travel paths. The use of multiple sensors and subsystems allow a level of safety in the event of sensor or subsystem failure.

Although multiple redundant subsystems are useful in the event a subsystem(s) fails, there are concerns regarding systemic errors, such as software errors. When redundant sub-systems replicate the same implementation, the combined system may not identify systematic (e.g. software) design errors inherent in the implementation. On the other hand, in redundant subsystems with different implementations, such as implementations of the same functionality with different algorithms (e.g. Artificial Intelligence or AI, machine learning or ML, neural network, rule based, etc.), systematic errors can be identified. This solution may not be able to identify performance limitations of the algorithms, which can lead to unacceptable safety issues which is addressed by the ISO standard draft "Safety of the Intended Functionality" or SOTIF (ISO/PAS 21448). For HAD systems, SOTIF is important to consider, which provides that a system's behavior should be safe from the perspective of actual or real-world performance and operational interface, in absence of random hardware and software faults and implementation errors. The challenge is to improve safety in redundant subsystems, especially subsystems implementing A, which can be difficult to test and validate. Heterogeneous redundant subsystems implementing different algorithms may not suffer from the systematic errors; however, such sub-systems may yield substantially different decisions or output paths, leading to a premature and unnecessary disengagement of the autonomous driving.

Subsystems provide separate outputs or travel paths. At present it is expected that the outputs, such as world models, path plans, or travel paths be the same. To account for subsystem failures or discrepancies, majority voting of the outputs can take place. The outlier or minority output is voted out by the majority. As to a safety issue, it is assumed that the majority voted output is free from any potential collisions. This may not be true. The concern is how can a HAD system determine potential safety issues and avoid such even when subsystems did not detect them separately.

DETAILED DESCRIPTION

Described herein are a system, method and device for comparison of subsystem outputs or travel paths of redundant subsystems in self-driving, autonomous driving, or Highly Automated Driving (HAD) vehicles. It is to be understood, that other applications can also be implemented, including and not limited to robotics, drones, and other vehicles and transports. A comparison is performed from a safety perspective. If projected outputs, such a world models or path plans are the same, a match is reported. If outputs are different, but free of conflicts from a safety perspective, a mismatch without a safety critical conflict is reported. If the outputs have a safety critical conflict, a mismatch and safety critical conflict is reported. A correct output (world model or path plan) is not necessarily reported; however, a potential safety critical conflict can be avoided. In certain implementations, a comparator (safety-aware comparator) is implemented. The comparator can provide results to an arbiter that includes a selector that selects appropriate world models or travel paths, which in turn provide commands for actuators that control the vehicle.

FIG. 1 shows a simplified world environment for a vehicle implemented with a safety-aware configuration. The three-dimensional world environment 100 depicts a self-driving, autonomous driving, or Highly Automated Driving (HAD) or an Ego vehicle 102. The Ego vehicle 102 is implemented with a safety-aware configuration of sensors and systems/subsystems that detect safety conflicts as the Ego vehicle 102 travels along a travel path 104. The Ego vehicle 102 is made aware of various objects, traffic control input, roads, etc. that are present in the world environment 100. Awareness of such objects, traffic control input, roads, etc. allows the Ego vehicle 102 to continue along the travel path 104 without safety conflicts, such as a collision with the pedestrian 122.

Objects in world environment 100 can be stationary, moving, or stationary one moment and moving a moment later. Because of the dynamic nature of travel of Ego vehicle 102 and that objects in the world environment 100 can change/move, based on a time segment in the future, potential safety conflicts or safety threats are constantly changing. Therefore, travel path 104 and safety conflicts are predicted based on a snapshot at a moment in time during various projected times in the future.

Examples of stationary objects can include trees 106, 108, 110, 112. Moving objects can include other vehicles 114 and 116, and bicyclist 118. Examples of stationary objects that can becoming moving objects can include pedestrians 120 and 122. Traffic controls can include traffic light 124 and street sign 126, which can also be considered as a stationary object. Furthermore, drivable space or a road 128 is part of world environment 100.

The Ego vehicle 102 can include various sensors and inputs, which can be redundant and dissimilar, such as optical, camera, radar, lidar, sonar, global navigation satellite system (GNSS), inertia, velocity, cellular telephone, dedicated short range communication (DSRC), etc. Such sensors can detect the objects in world environment 100 as three-dimensional geometric objects. For example, the objects may be bound and interpreted by three-dimensional boxes. In certain implementations, comparison as described below is based on geometric comparison.

In certain implementations, a comparator is implemented with the sensors, as further discussed below. Data structures of objects can be analyzed as follows. For moving objects: Ego vehicle 102 position, orientation, direction and speed; other vehicles 114, 116 position, orientation, direction and speed; pedestrians 120 and 122 and other road user's (e.g. bicyclist 118) position, orientation, direction and speed. For stationary objects: road curvature, width, lanes geometries; position and shape of stationary objects, such as trees 106, 108, 110, 112, traffic sign 126, road markings, houses, etc. In addition, drivable space or road 128 is analyzed. Furthermore, all the data structures include a list of their anticipated values for the projected future time moments.

Figure 2:
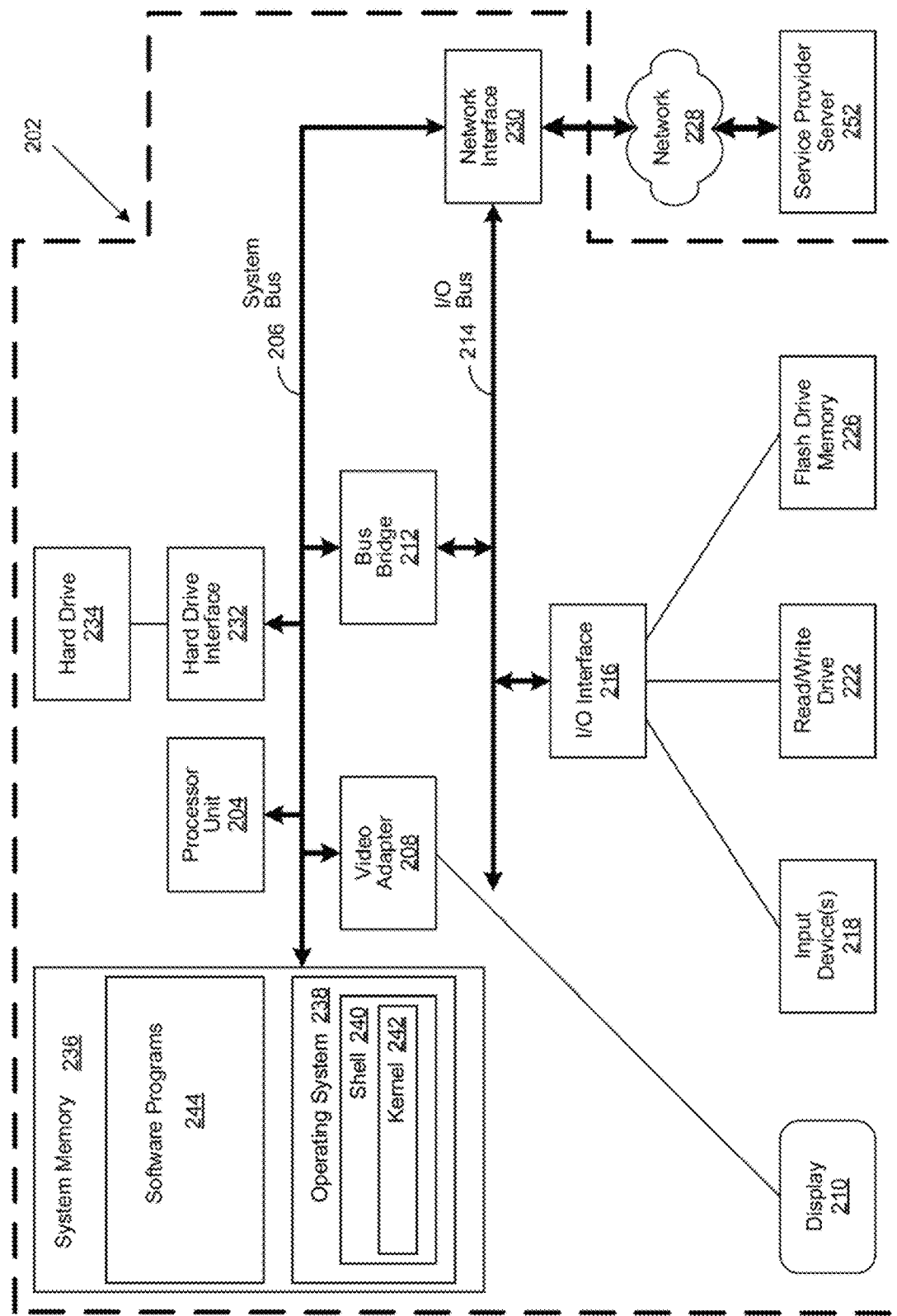
FIG. 2 is a block diagram of an information processing system capable of performing computing operations.

FIG. 2 illustrates an information processing system 202, more particularly, a processor and common components, which is a simplified example of a computer system capable of performing the computing operations described herein. As discussed the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Certain implementations may incorporate all, fewer, or greater than the components described herein.

Information processing system 202 includes a processor unit 204 that is coupled to a system bus 206. Processor unit 204 can have various architectures, such as a system on a chip (SOC), electronic control unit (ECU), general-purpose processor, multiprocessor, custom compute accelerator, FPGA, hard-wired ASIC, etc. A video adapter 208, which controls a display 210, is also coupled to system bus 206. System bus 206 is coupled via a bus bridge 212 to an Input/Output (I/O) bus 214. An I/O interface 216 is coupled to I/O bus 214. The I/O interface 216 affords communication with various I/O devices, including input devices 218, a read/write drive 222, and a flash drive memory 226. The format of the ports connected to I/O interface 216 may be any known to those skilled in the art of computer architecture, including but not limited to Universal Serial Bus (USB) ports. The information processing system 202 is able to communicate with a service provider server 238 via network 102 using a network interface 230, which is coupled to system bus 206.

A hard drive interface 232 is also coupled to system bus 206. Hard drive interface 232 interfaces with a hard drive 234. In a preferred embodiment, hard drive 234 populates a system memory 236, which is also coupled to system bus 206. Data that populates system memory 236 includes the information processing system's 202 operating system (OS) 238 and software programs 244.

OS 238 includes a shell 240 for providing transparent user access to resources such as software programs 244. Generally, shell 240 is a program that provides an interpreter and an interface between the user and the operating system. More specifically, shell 240 executes commands that are entered into a command line user interface or from a file. Thus, shell 240 (as it is called in UNIXV), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. While shell 240 generally is a text-based, line-oriented user interface, the present invention can also support other user interface modes, such as graphical, voice, gestural, etc.

As depicted, OS 238 also includes kernel 242, which includes lower levels of functionality for OS 238, including essential services required by other parts of OS 238 and software programs 244, including memory management, process and task management, disk management, and mouse and keyboard management. In certain implementations, network interface 230 connects to a network 228 which connects to service provider server 252.

The hardware elements depicted in the information processing system 202 are not intended to be exhaustive, but rather are representative to highlight components that can be implemented by the present invention. For instance, the information processing system 202 may include alternate memory storage devices. These and other variations are intended to be within the spirit, scope and intent of the present invention.

Figure 3A:
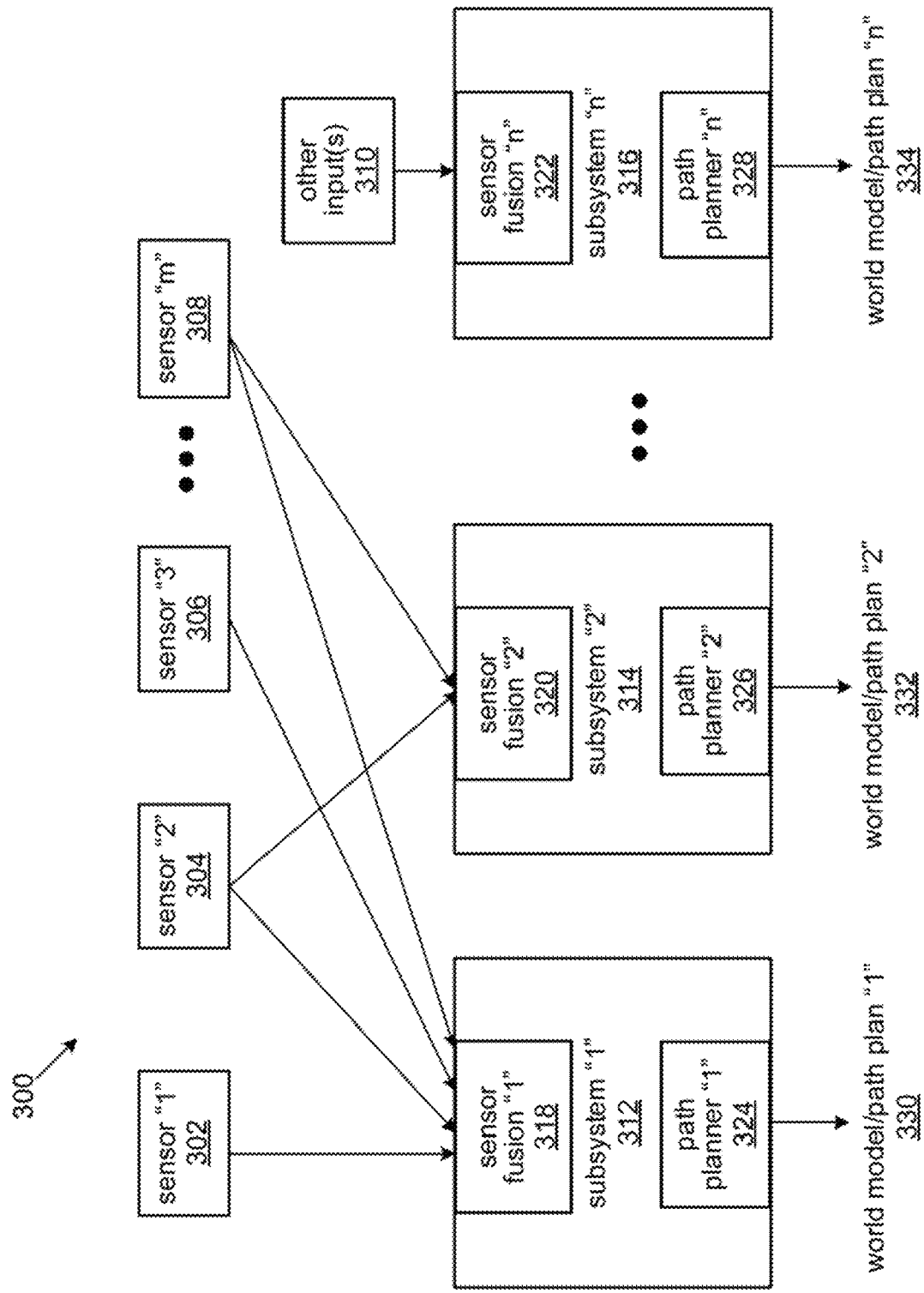
FIG. 3A is a block diagram of subsystems that output a world model or path plan in a safety-aware autonomous driving vehicle.

FIG. 3A shows a simplified block diagram of subsystems that output a world model or path plan in a safety-aware autonomous driving vehicle. In certain embodiments, system 300 is implemented in a self-driving, autonomous driving, or Highly Automated Driving (HAD) vehicle, such as Ego vehicle 102. The system 300 includes various and multiple sensors, such as sensor "1" 302, sensor "2" 304, sensor "3" 306 through sensor "m" 308, which can be configured to collect data or information as to objects of the world environment 100 of the Ego vehicle 102 as described above in FIG. 1. Sensor "1" 302, sensor "2" 304, sensor "3" 306 through sensor "in" 308 can be implemented to collect different inputs from the world environment. The inputs can be dissimilar from one another. Sensor "1" 302, sensor "2" 304, sensor "3" 306 through sensor "m" 308 can also be placed on different locations of the Ego vehicle 102 and can be part of other data/input collecting or gathering systems, such as optical, camera, radar, lidar, sonar, heat, global navigation satellite system (GNSS), inertia, velocity, cellular telephone, etc. In certain implementations, other inputs 310 can also be included. Other inputs 310 can include determined travel way points, activation commands, inputs from other non-sensor implemented systems, etc.

Sensor "1" 302, sensor "2" 304, sensor "3" 306 through sensor "m" 308 and other inputs 310 can provide world environment 100 data or information to multiple redundant subsystems, such as subsystem "I" 312, subsystem "2" 314 through subsystem "n" 316. In certain implementations, subsystem "1" 312, subsystem "2" 314 through subsystem "n" 316 are heterogenous from one another, and implement different algorithms such as artificial intelligence (AI), machine learning (ML), neural network, formally-defined algorithms, rule-based algorithms, etc. in calculating outputs, such a world models or path plans. The implementation of redundant subsystems can address events when a specific subsystem fails. Implementation of redundant heterogenous subsystems can address systemic or design errors in a specific subsystem implementation, such as hardware or software errors. In certain embodiments, sensor diversity and the inputs from different sensors can be implemented. As discussed, different types of data or information can be collected or gathered from sensor "1" 302, sensor "2" 304, sensor "3" 306 through sensor "m" 308. Different sensors can have inherent advantages or disadvantages from one another. For example, an optical-based sensor has different qualities compared to a radar-based sensor. Furthermore, as in subsystems, homogenous redundancy can be implemented for sensors to address potential failures in a sensor(s) and provide a backup(s).

In certain embodiments, subsystem "1" 312, subsystem "2" 314 through subsystem "n" 316 include sensor fusion components, such as sensor fusion "I" component 318, sensor fusion "2" component 320 through sensor fusion "n" component 322 implemented as part of the respective subsystems. Sensor fusion components can receive data or information input from various sensors, such as sensor "1" 302, sensor "2" 304, sensor "3" 306 through sensor "m" 308, and other inputs 310. The sensor fusion components can achieve a sense of sensor heterogeneity or diversity by receiving input from different sensors and/or different sensor types. For example, sensor fusion "I" component 318 receives data or information input from sensor "1" 302, sensor "2" 304, sensor "3" 306 through sensor "m" 308. Sensor fusion "2" component 320 receives data or information input from sensor "2" 304 and sensor "m" 308. Sensor fusion "n" component 322 receives data or information input from other inputs 310.

In certain embodiments, subsystem "1" 312, subsystem "2" 314 through subsystem "n" 316 include path planner components, such as path planner "1" component 324, path planner "2" component 326 through path planner "n" component 328 implemented as part of the respective subsystems. Each of the path planner components can be configured to provide different world models or path plans that can include projected travel paths, drivable space geometry, locations, dimensions, orientations, etc. World models include moving and static objects for the Ego vehicle 102. For example, path planner "1" 324 provides a projected world model/path plan 330. Path planner "2" 326 provides a world model/path plan 332. Path planner "n" 328 provides a projected world model/path plan 334. In certain implementations, the projected world model or path plans can be calculated and provided for during a certain time interval. As an example, calculations of world models can be performed every 100 milliseconds (ms). Each computed world model can include the projected locations and speed values for a projected time in future.

Figure 3B:
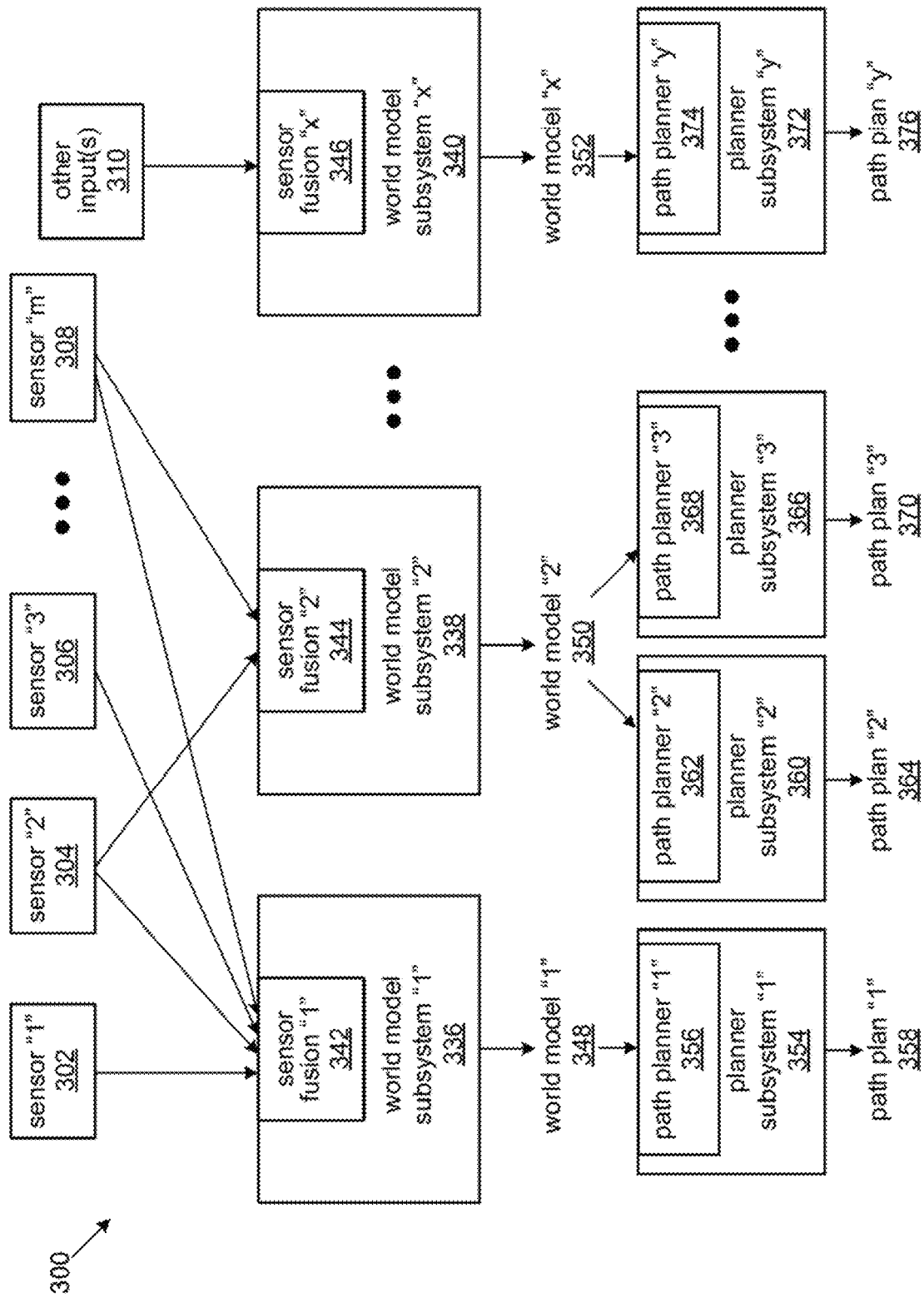
FIG. 3B is a block diagram of subsystems that output a path plan in a safety-aware autonomous driving vehicle.

FIG. 3B shows a simplified block diagram of subsystems that output a path plan in a safety-aware autonomous driving vehicle. In this implementation, system 300 provides path plans. As in FIG. 3A above, world model subsystem "1" 336, world model subsystem "2" 338 through world model subsystem "x" 340 receive input from sensors and/or other inputs. In this example, world model subsystem "1" 336 receives inputs from sensor "1" 302, sensor "2" 304, sensor "3" 306 through sensor "m" 308 at sensor fusion component "1" 342. World model subsystem "1" 336 receives inputs from sensor "2" and sensor "m" 308 at sensor fusion component "2" 344. World model subsystem "x" 340 receives input from other input(s) 310 at sensor fusion component "x" 346.

In this implementation, world models are output from the response world model subsystems. World model subsystem "1" 336 outputs a world model "1" 348. World model subsystem "2" 338 outputs a world model "2" 350. World model subsystem "x" 340 outputs a world model "1" 352.

In this implementation, planner subsystems receive world models at a path planner and output path plans. In certain implementations, different planner subsystems can receive the same world model and can output different path plans, as will be described. Planner subsystem "1" 354 receives world model "1" 348 at path planner component "1" 356 and outputs a path plan "1" 358. Planner subsystem "2" 360 receives world model "2" 350 at path planner component "2" 362 and outputs a path plan "2" 364. Planner subsystem "3" 366 also receives world model "2" 350 at path planner component "3" 368 and outputs a path plan "3" 370. Planner subsystem "y" 360 receives world model "x" 352 at path planner component "2" 374 and outputs a path plan "y" 376.

Figure 4A:
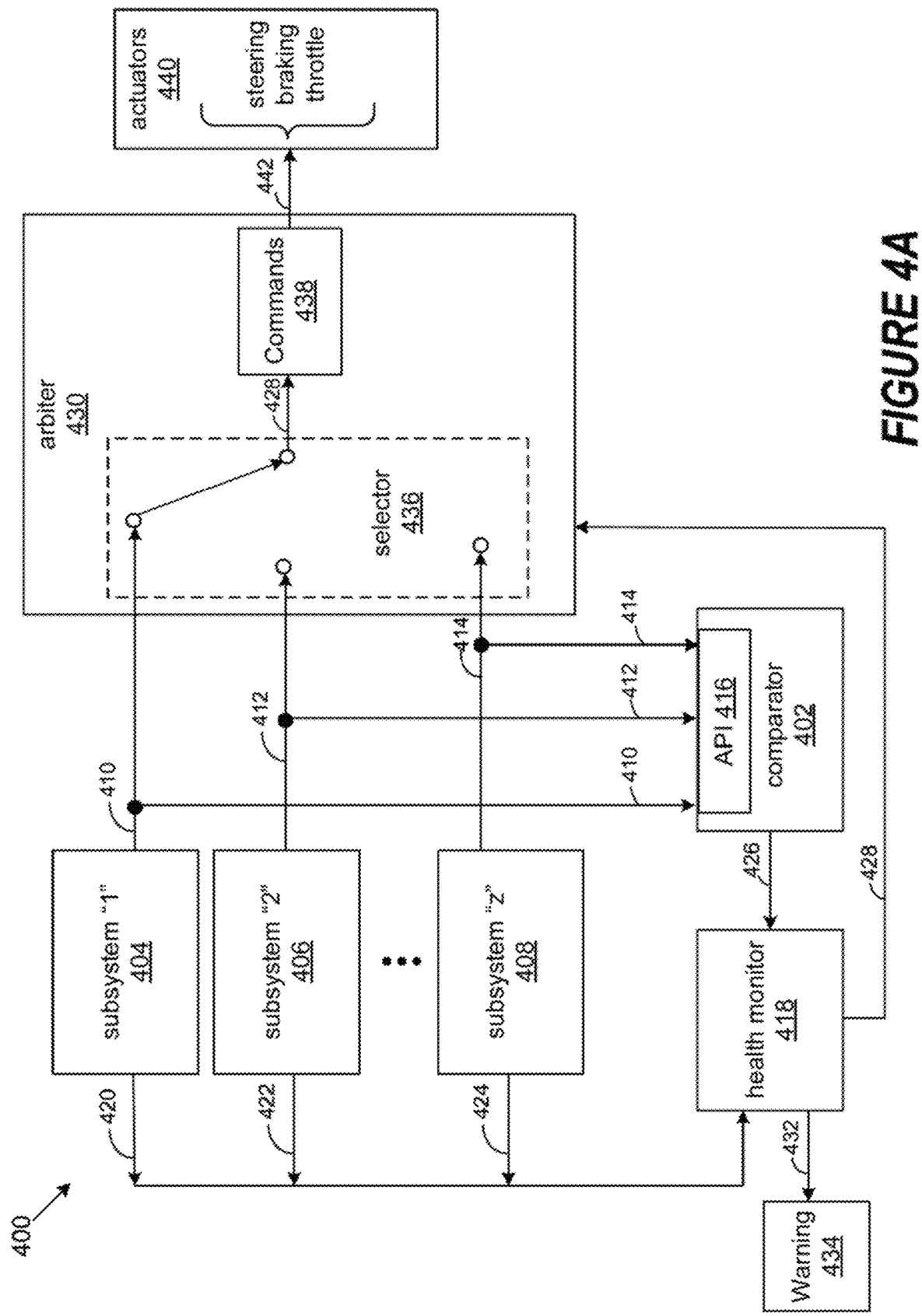
FIG. 4A is a block diagram of subsystems with a comparator providing input to a health monitor in a safety-aware autonomous driving vehicle.

FIG. 4A shows a block diagram of subsystems with a comparator. In certain embodiments, system 400 extends the system 300 as described in FIG. 3A and FIG. 3B. In certain implementations, system 400 includes a comparator 402 which can analyze data structures related to world environment 100 of Ego vehicle 102, such as moving objects and stationary objects as described above. Comparator 402 can be configured to receive projected outputs, such a world models or path plans from subsystems, such as subsystem "1" 312, subsystem "2" 314 through subsystem "n" 316 shown in FIG. 3A, and planner subsystem "1" 354, planner subsystem "2" 356, planner subsystem "3" 368 through planner subsystem "y" 372 shown in FIG. 3B.

System 400 includes subsystem "1" 404, subsystem "2" 406 through subsystem "z" 408 which output a world model or path plan. In certain implementations, system 400 is part of device. The respective outputs are shown as outputs 410, 412 through 414 are received by comparator 402. In certain implementations, a predefined application program interface or API 416 as a component of comparator 402, is used to acquire the projected output world models or path plans 410, 412 through 414. The comparator 402 can be configured to compare projected world models or path plans of subsystems to determine potential safety conflicts or safety threats. In certain implementations, three-dimensional geometric comparison is used by comparator 402. As further discussed below, overlays of projected output world model or path plans can be performed to determine matches, mismatches, no safety conflicts, and safety conflicts.

In certain embodiments, system 400 includes a health monitor 418. Health monitor 418 can be configured to check or determine status of subsystem "1" 404, subsystem "2" 406 through subsystem "z" 408. Status can be provided as respective outputs 420, 422, 424, and can include data or information as to availability, faults, failures, etc. In certain implementations, the comparator 402 provides data or information 426 to the health monitor 418. Such data or information 426 can be results of overlays or comparison of projected world paths and path plans and determination as to matches, mismatches, no safety conflicts, and safety conflicts. Based on data and information received via 420, 422, 424 and 426, health monitor 418 can be configured to provide instructions 428 to an arbiter 430. In this implementation, the comparator 402 influences the decisions and instructions of the health monitor 418. The instructions 428 to arbiter 430 can be based on subsystem health status, and potential safety conflicts. In certain implementations, the health monitor 418 provides an output 432 which is received by as a potential warning 434 to a "driver" or a "passenger" of the Ego vehicle 102.

Arbiter 430 can include a selector 432 that can select an appropriate world model or path plan from projected world models or path plans 410, 412 through 414. The selected world model or path plan can then influence commands 438, which receives an input 440 from selector 436. Commands 438 can be a single set of commands that control actuators 440 of the Ego vehicle 102. An output 442 is provided by arbiter 430 to actuators 440. The actuators 440 can include steering, braking, throttle, etc. of Ego vehicle 102, and are activated or controlled based on the selected output world model or path plan.

Figure 4B:
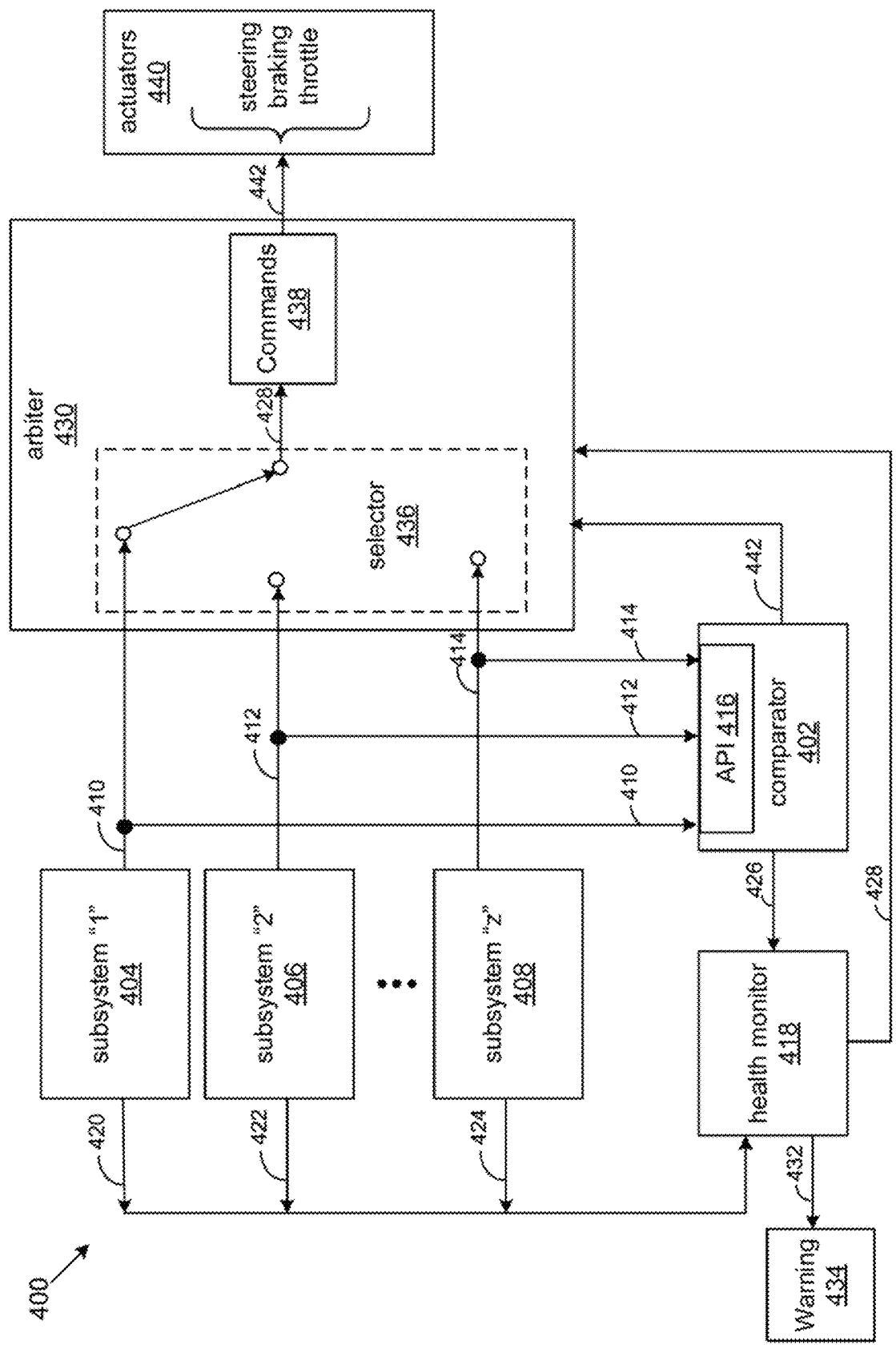
FIG. 4B is a block diagram of subsystems with a comparator providing input to an arbiter in a safety-aware autonomous driving vehicle.

FIG. 4B shows block diagram of subsystems with a comparator that directly provides input to an arbiter. In this implementation shown in FIG. 4B, system 400 includes the elements as described in FIG. 4A; however, the comparator 402 directly influences or provides instructions (input) 442 to the arbiter 430. The instructions or input to the arbiter can include which world model or path plan for selector 436 to choose from world models or path plans 410, 412 through 414. The instructions 442 can be based on results of overlays or comparison of projected output world paths or path plans and determination as to matches, mismatches, no safety conflicts, and safety conflicts. Health monitor 418 can provide input to arbiter 430 as to the availability or health status of subsystem "1" 404, subsystem "2" 406 through subsystem "z" 408.

As discussed, the comparator 402 can be configured to compare different world models or path plans of multiple redundant subsystems, such as subsystem "1" 404, subsystem "2" 406 through subsystem "z" 408. The world models can include the Ego vehicle 102 and an anticipated path in an incremental time in the future. The world models also can include moving and stationary objects that can cause potential safety conflicts. The comparator 402 is configured to geometrically overlay multiple world models to determine potential safety conflicts. The overlay can be directed interpreting or calculating objects in a two-dimensional or three-dimensional geometric space. FIGS. 5A, 5B, 5C, 5D, 5E, and 5F are examples of overlaying world models and determining matches, mismatches, no safety conflicts, and safety conflicts between the output world model or path plans. In the examples that are described, a comparison is made as to two subsystems; however, it is to be understood, that comparison and overlaying can be performed for more than two subsystems.

Figure 5A:
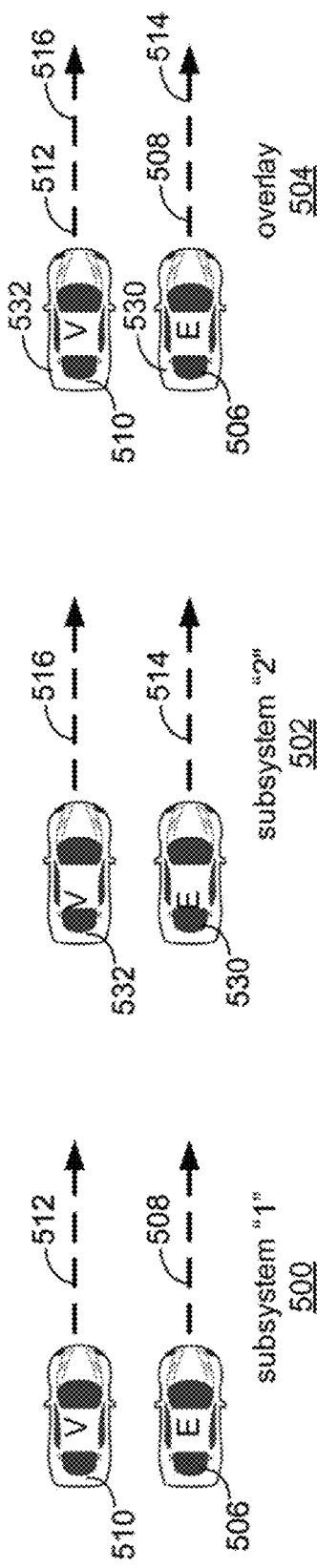
FIG. 5A is an example of an overlay of matching output world model or path plans.

FIG. 5A shows an overlay of matching output world model or path plans. In this example, a subsystem "1" 500 outputs a world model or path plan, a subsystem "2" 502 outputs a world model or path plan, and an overlay 504 of the two world models or path plans.

The subsystem "1" 500 world model or path plan shows an Ego vehicle 506 traveling in a direction 508, and another vehicle 510 traveling in a direction 512. The subsystem "2" 502 world model or path plan shows Ego vehicle 506 traveling in a direction 516, and the other vehicle 510 traveling in a direction 514. The overlay 504 shows that the two world models or path plans match, and there is no safety conflict.

Figure 5B:
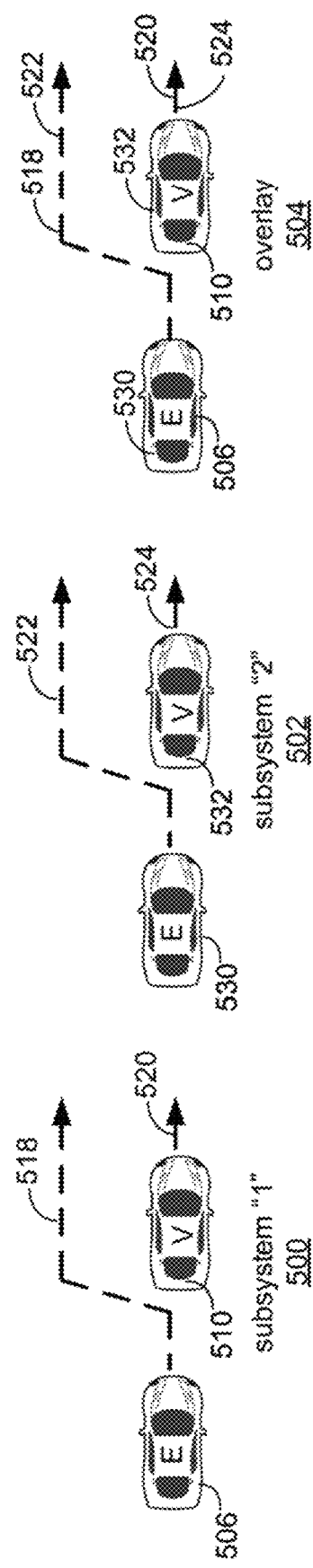
FIG. 5B is an example of an overlay of matching output world model or path plans.

FIG. 5B shows an overlay of matching output world models or path plans. In this example, there is subsystem "1" 500 world model or path plan, subsystem "2" 502 world model or path plan, and an overlay 504 of the two world models or path plans.

The subsystem "1" 500 world model or path plan shows Ego vehicle 506 traveling in a direction 518, and the other vehicle 510 traveling in a direction 520. The subsystem "2" 502 world model or path plan shows Ego vehicle 506 traveling in a direction 522, and the other vehicle 510 traveling in a direction 524. The overlay 504 shows that the two world models or path plans match, and there is no safety conflict.

Figure 5C:
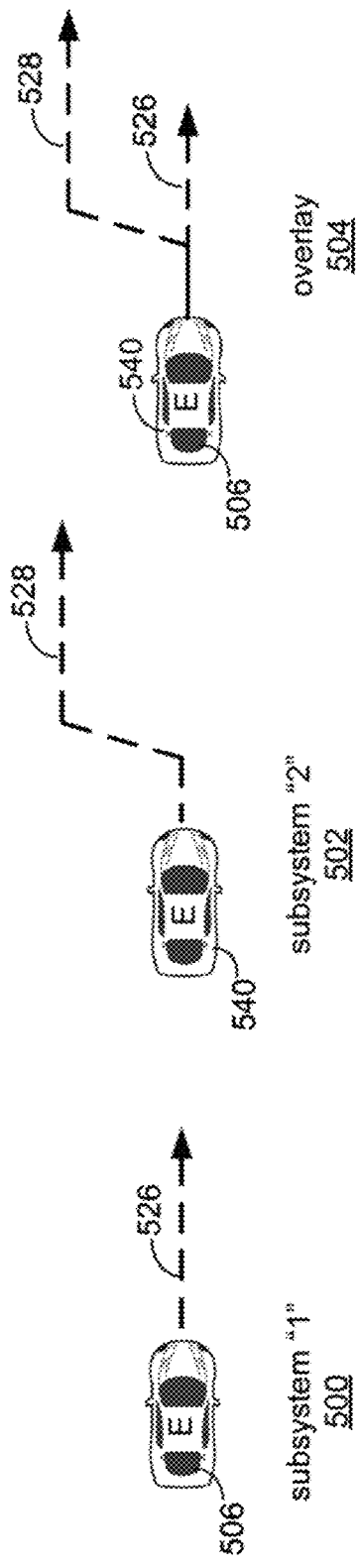
FIG. 5C is an example of an overlay of non-matching output world model or path plans, with no safety conflict.

FIG. 5C shows an overlay of non-matching world models or path plans, with no safety conflict. In this example, there is system "1" 500 world model or path plan, system "2" 502 world model or path plan, and an overlay 504 of the two world models or path plans.

The subsystem "1" 500 world model or path plan shows Ego vehicle 506 traveling in a direction 526. The subsystem "2" 502 world model or path plan shows Ego vehicle 506 traveling in direction 528. The overlay 504 shows that the two world models or path plans do not match, but there is no safety conflict.

Figure 5D:
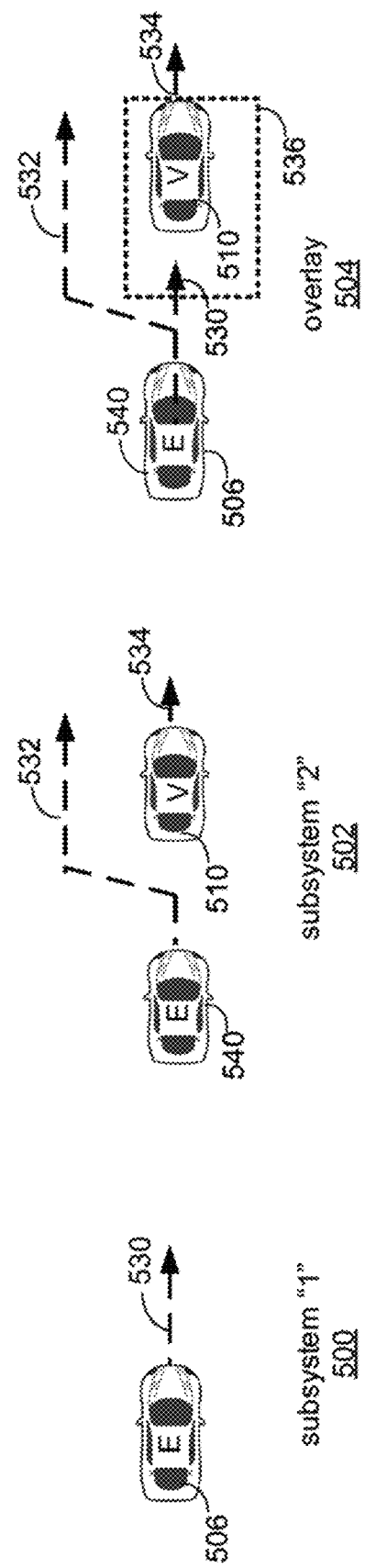
FIG. 5D is an example of an overlay of non-matching output world model or path plans, with a safety conflict.

FIG. 5D shows an overlay of non-matching world models or path plans, with a safety conflict. In this example, there is system "1" 500 world model or path plan, system "2" 502 world model or path plan, and an overlay 504 of the two world models or path plans.

The subsystem "1" 500 world model or path plan shows Ego vehicle 506 traveling in a direction 530 and has not identified the other vehicle 506. The system "2" 502 world model or path plan shows Ego vehicle 506 traveling in direction 532, and the other vehicle 510 traveling in a direction 534. The overlay 504 shows that the two world models or path plans do not match, and that there is potential safety conflict identified by the dotted box 536.

Figure 5E:
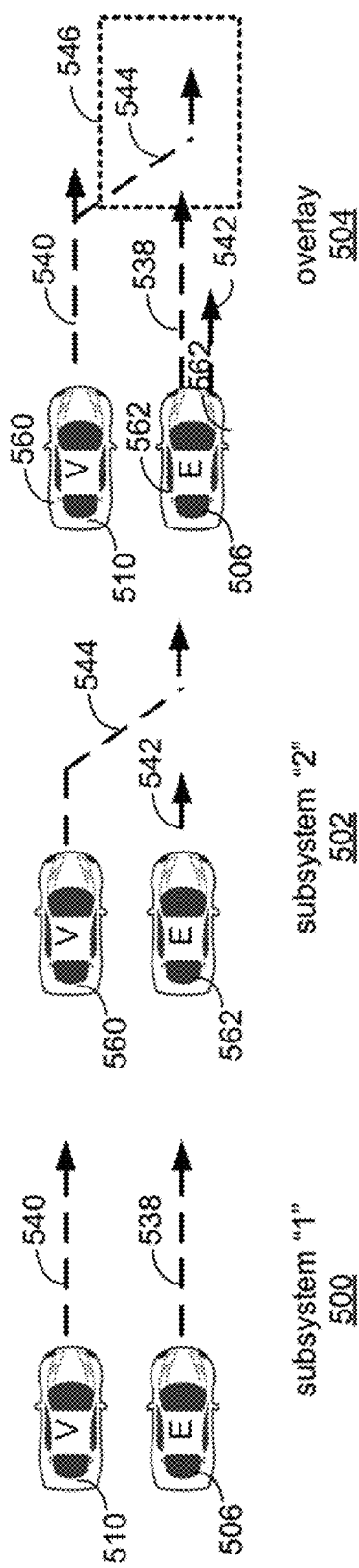
FIG. 5E is an example of an overlay of non-matching output world model or path plans, with a safety conflict.

FIG. 5E shows an overlay of non-matching world model or path plans, with a safety conflict. In this example, there is subsystem "1" 500 world model or path plan, subsystem "2" 502 world model or path plan, and an overlay 504 of the two world models or path plans.

The subsystem "1" 500 world model or path plan shows Ego vehicle 506 traveling in a direction 538 and the other vehicle 510 traveling in a direction 540. The subsystem "2" 502 world model or path plan shows Ego vehicle 506 traveling in direction 542, and the other vehicle 510 traveling in a direction 544 and cutting in front of Ego vehicle 506. The overlay 504 shows that the two world models or path plans do not match, and that there is potential safety conflict identified by the dotted box 546.

Figure 5F:
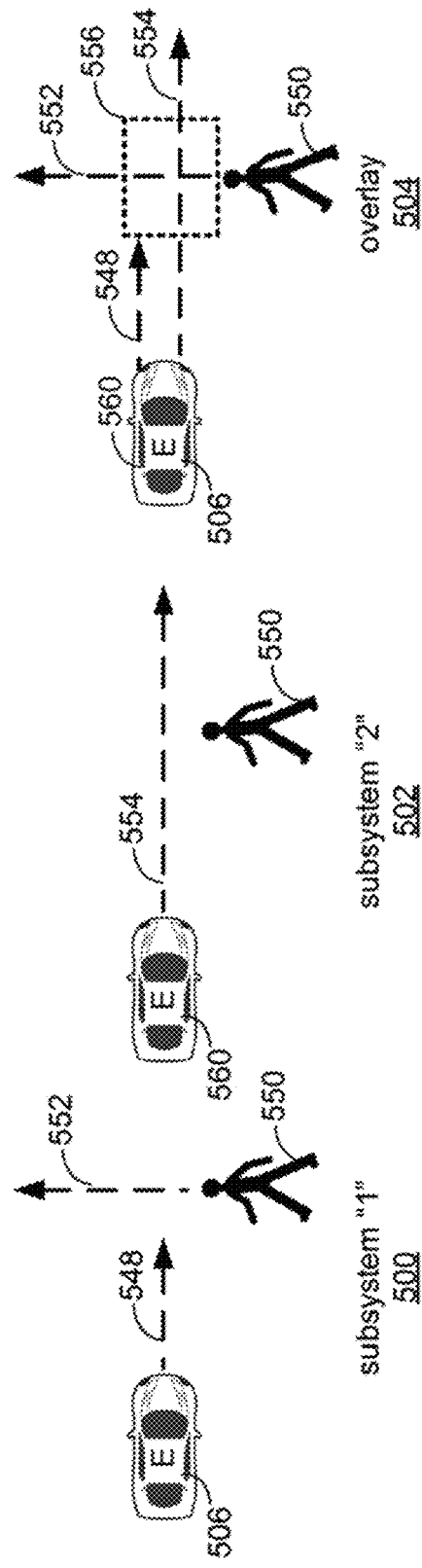
FIG. 5F is an example of an overlay of non-matching output world model or path plans, with a safety conflict.

FIG. 5F shows an overlay of non-matching world models or path plans, with a safety conflict. In this example, there is subsystem "1" 500 world model or path plan, subsystem "2" 502 world model or path plan, and an overlay 504 of the two output world models or path plans.

The subsystem "1" 500 world model or path plan shows Ego vehicle 506 traveling in a direction 548 and a pedestrian 550 that is anticipated to cross 552 in front of Ego vehicle 548. The subsystem "2" 502 output world model or path plan shows Ego vehicle 506 traveling in direction 554, and shows pedestrian 550; however, does not show that the pedestrian 550 will cross in front of Ego vehicle 506. The overlay 504 shows that the two world models or path plans do not match, and that there is potential safety conflict identified by the dotted box 556.

Figure 6:
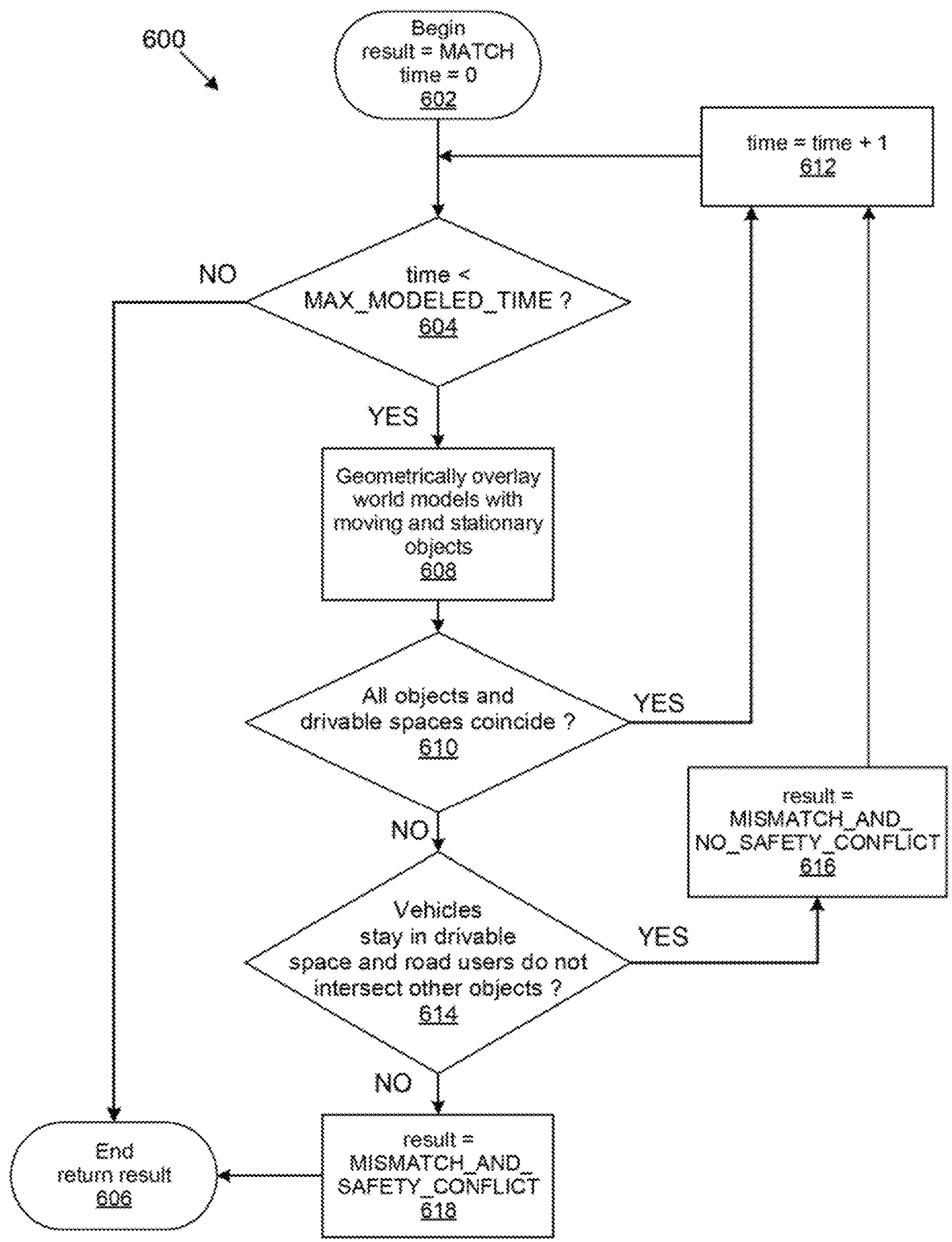
FIG. 6 is a generalized flowchart for determining safety conflicts.

FIG. 6 is a generalized flowchart 600 for determining safety conflicts. The flowchart 600 compares outputs or travel paths of multiple redundant subsystems for a self-driving, autonomous driving, or Highly Automated Driving (HAD) vehicles, and allowing such a HAD vehicle to be safety-aware. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 602, the process 600 starts with an initialization of time equal to "0", and a default that results of comparison of subsystem outputs or travel paths are a "match." If time is more than a predetermined maximum time in future, then following the "NO" branch of block 604, at step 606 the process 600 ends, and result is returned. If time is less than the predetermined maximum time, then following the "YES" branch of block 604, at step 608, a geometric overlay is performed of world models of the subsystems. The overlay can be a two-dimensional or three-dimensional geometric overlay of the Ego vehicle, stationary objects, moving objects, road curvature, traffic control, etc. If the objects and drivable space in the travel paths or world models of the subsystems coincide within a given tolerance, then following the "YES" branch of block 610, at step 612, the time is incremented to the next time value in future, and the process 600 continues at block 604. Examples of incremented time values include 100 milliseconds (ms). If the objects and drivable space do not coincide within the given tolerance and there is no geometric intersection of objects with the Ego vehicle, then following the "NO" branch of block 610, a determination is performed at block 614. If the vehicles in the world models continue in the drivable space or projected travel path without intersecting (geometric intersection) with other objects, then following the "YES" branch of block 614, at step 616, the result is there is a mismatch and no safety conflict. At step 612 the time is incremented to the next time value, and the process 600 continues at block 604. If the Ego vehicle continues outside of the drivable space or projected travel path is determined to intersect with other objects, then following the "NO" branch of block 614, at step 618, the result is a mismatch and a safety conflict. At step 606 the process 600 ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In certain implementations, a system on a chip or SOC may be implemented.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

What is claimed is:

1. A computer-implemented method to determine safety conflicts in a vehicle comprising:
   receiving data structures of objects in a world environment of the vehicle from multiple redundant subsystems, wherein each subsystem provides a projected world model or path plan;
   comparing the data structures of projected world models of the multiple redundant subsystems;
   determining based on the comparing if the projected world models or path plans of the multiple redundant subsystems match or do not match; and
   determining based on the comparing if a safety conflict exists if the vehicle geometrically intersects with an object.

2. The method of claim 1, wherein the multiple redundant subsystems are heterogenous.

3. The method of claim 1, wherein the multiple redundant subsystems receive world environment information from dissimilar sensors.

4. The method of claim 1, wherein the data structures are either two-dimensional or three-dimensional geometrical representations of the objects in the world environment.

5. The method of claim 1, wherein the projected world models or path plans are calculated based on an incremental time segment.

6. The method of claim 1, wherein the comparing is performed by geometrically overlaying the data structures.

7. The method of claim 1 further comprising providing input to a health monitor as to whether the projected world models match or do not match, and if a safety conflict exists, wherein the health monitor provides instructions to an arbiter based on the input to the health monitor.

8. The method of claim 1 further comprising providing instructions to an arbiter based on whether the projected world models or path plans match or do not match, and if a safety conflict exists.

9. A system comprising:
   a processor;
   a data bus coupled to the processor; and
   a computer-usable medium embodying computer program code, the computer-usable medium being coupled to the data bus, the computer program code used for determining safety conflicts of a vehicle and comprising instructions executable by the processor and configured for:
   receiving data structures of objects in a world environment of the vehicle from multiple redundant subsystems, wherein each subsystem provides a projected world model or path plan for the vehicle;
   comparing the data structures of projected world model or path plan of the multiple redundant subsystems;
   determining based on the comparing if the projected world model or path plan of the multiple redundant subsystems match or do not match; and
   determining based on the comparing if a safety conflict exists if the vehicle intersects with an object.

10. The system of claim 9, wherein the multiple redundant subsystems are heterogenous.

11. The system of claim 9, wherein the multiple redundant subsystems receive world environment information from dissimilar sensors.

12. The system of claim 9, wherein the data structures are either two-dimensional or three-dimensional geometrical representations of the objects in the world environment.

13. The system of claim 9, wherein the projected world models or path plans are calculated based on an incremental time segment.

14. The system of claim 9, wherein the comparing is performed by geometrically overlaying the data structures.

15. The system of claim 9 further comprising providing input to a health monitor as to whether the projected world models or path plans match or do not match, and if a safety conflict exists, wherein the health monitor provides instructions to an arbiter based on the input to the health monitor.

16. The system of claim 9 further comprising providing instructions to an arbiter based on whether the projected world models or path plans match or do not match, and if a safety conflict exists.

17. A device comprising:
   a comparator that
      receives data structures of objects in a world environment of a vehicle from multiple redundant subsystems, wherein each subsystem provides a projected world model or path plan of the vehicle;
      compares the data structures of projected world models or path plans of the multiple redundant subsystems;
      determines based on the compared data structures, if the projected world models or path plans of the multiple redundant subsystems match or do not match; and
      determines based on the compared data structures, if a safety conflict exists if the vehicle geometrically intersects with an object.

18. The device of claim 17, wherein the multiple redundant subsystems are heterogenous.

19. The device of claim 17, wherein the data structures are either two-dimensional or three-dimensional geometrical representations of the objects in the world environment.

20. The device of claim 17, wherein the projected world models or path plans are calculated based on an incremental time segment.

21. The device of claim 17, wherein the comparing is performed by geometrically overlaying the data structures.

22. The device of claim 17, further comprising providing input to a health monitor as to whether the projected world models or path plans match or do not match, and if a safety conflict exists, wherein the health monitor provides instructions to an arbiter based on the input to the health monitor.

23. The device of claim 17, further comprising providing instructions to an arbiter based on whether the projected world models or path plans match or do not match, and if a safety conflict exists.

* * * * *